Feb. 18, 1930.  C. E. CARPENTER  1,747,503
DOUGHNUT MACHINE AND THE LIKE
Filed Feb. 29, 1928    5 Sheets-Sheet 1

Inventor
Charles E. Carpenter
by Thos. A. Banning
Atty.

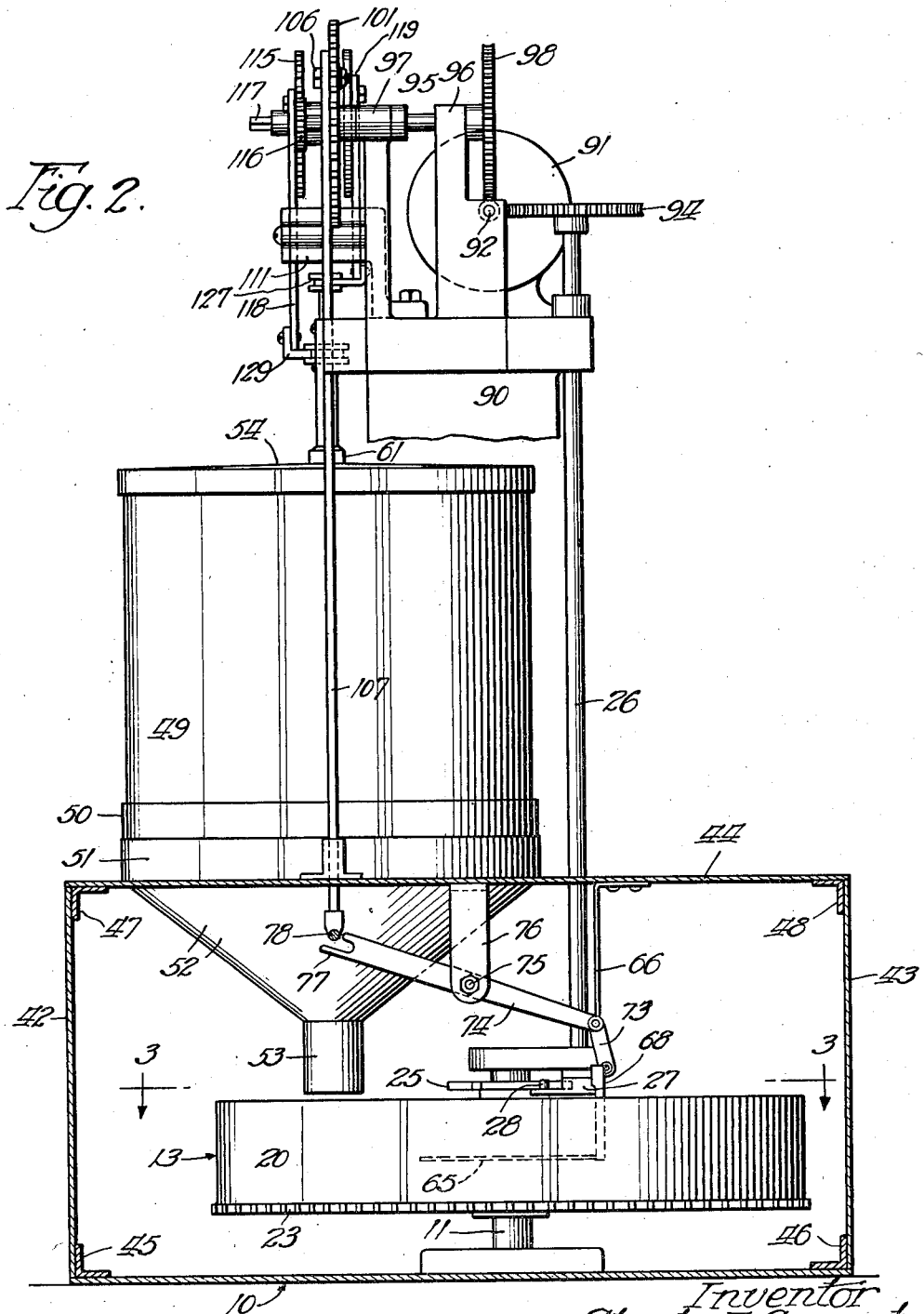

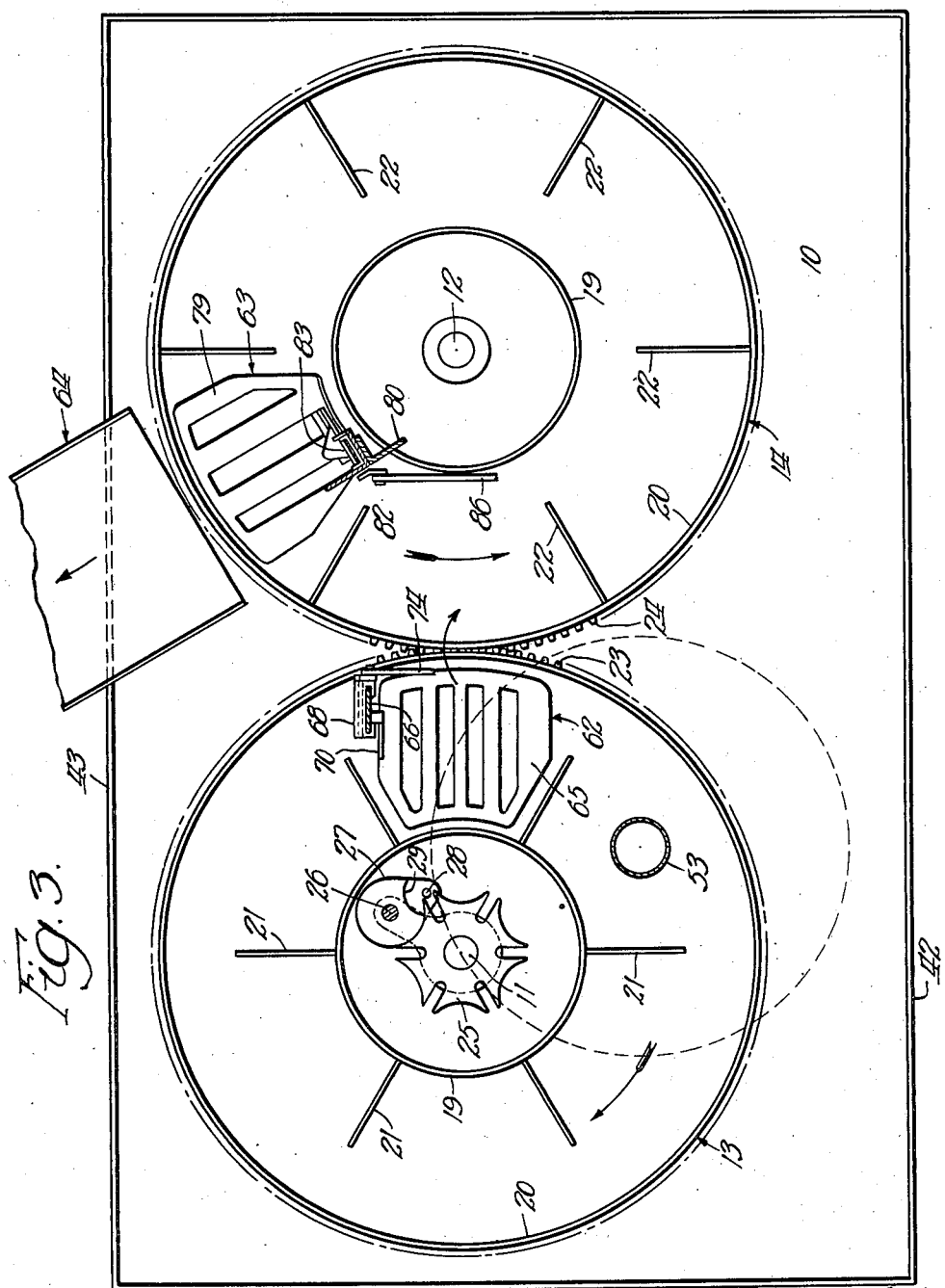

Feb. 18, 1930.   C. E. CARPENTER   1,747,503
DOUGHNUT MACHINE AND THE LIKE
Filed Feb. 29, 1928   5 Sheets-Sheet 4
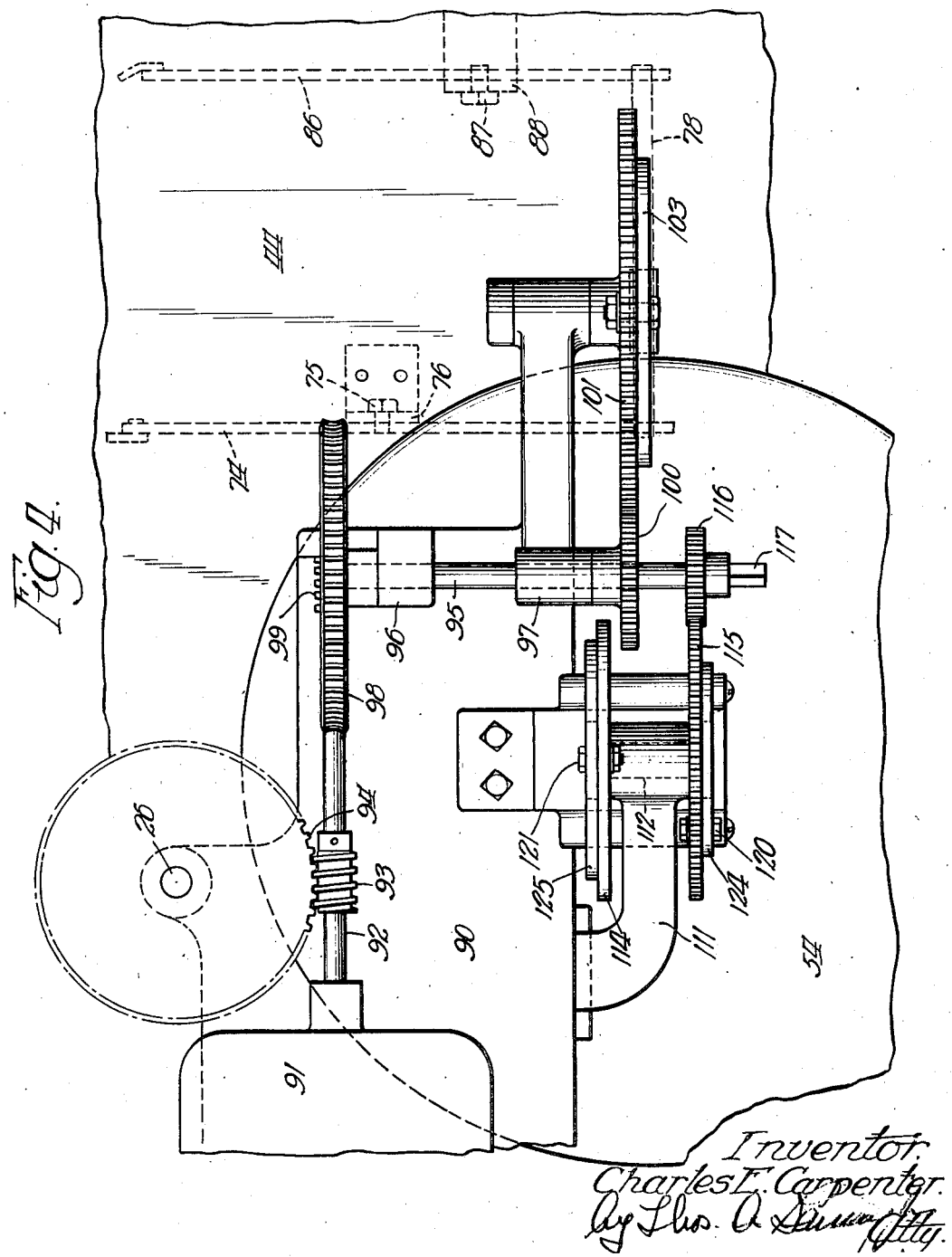
Inventor
Charles E. Carpenter

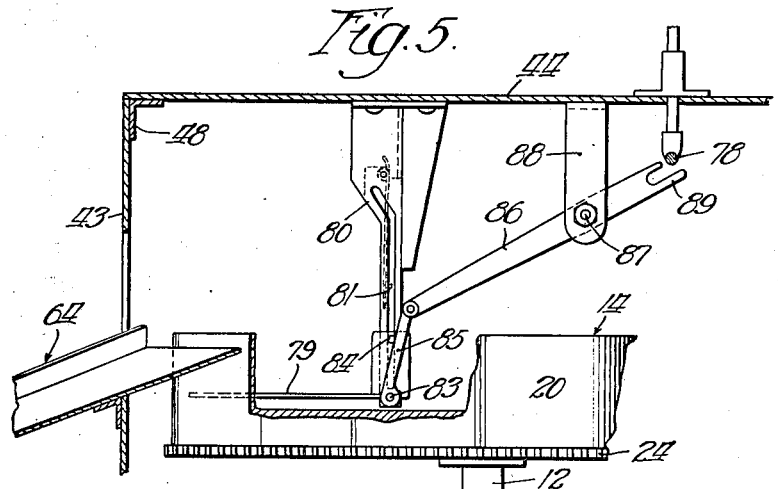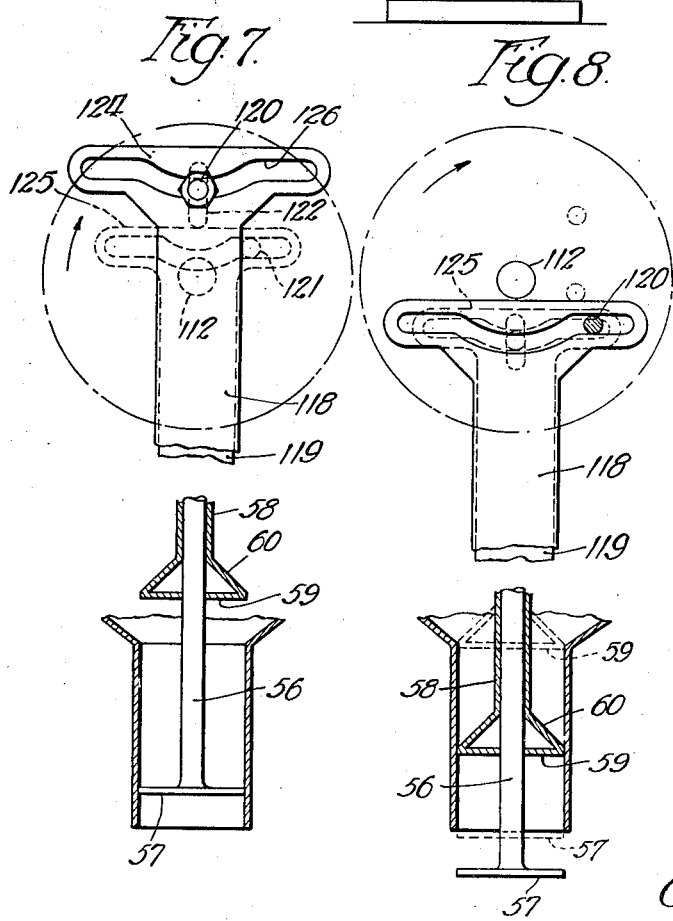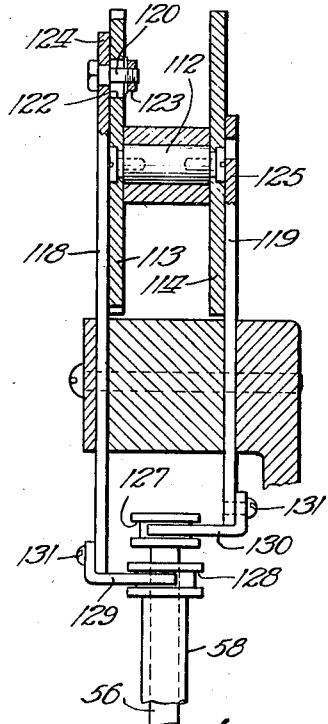

Patented Feb. 18, 1930

1,747,503

UNITED STATES PATENT OFFICE

CHARLES E. CARPENTER, OF CHICAGO, ILLINOIS

DOUGHNUT MACHINE AND THE LIKE

Application filed February 29, 1928. Serial No. 258,014.

This invention has to do with certain improvements in doughnut machines and the like. It has to do with improvements in the construction of the mechanism for preparing and feeding dough batches into the frying pans; and also the construction and arrangement of the frying pans themselves as well as the means for turning the doughnuts and for delivering them completely fried from the machine.

One of the objects of the invention is to provide a machine of such arrangement that the frying of the doughnuts on the two sides is accomplished separately in two distinct pans as distinguished from those constructions in which the frying operations for both sides of the doughnut are practiced in a single receptacle. In this connection it is noted that it is frequently necessary to regulate the conditions of the temperature, depth of grease, and other important factors differently for frying the two sides of the doughnut in order to produce the most delicious and perfect production. These results I am able to accomplish in machines embodying the present invention since I am thereby enabled to regulate the factors controlling the two frying operations quite independently of each other and to the best advantage in each case.

Since the present machine embodies the use of two separate pans or receptacles for frying the two sides of the doughnuts it follows that said machine is not provided with any turning device in conjunction with a single pan as in the case of previous machines. On the contrary the machine of the present invention incorporates the use of a dough batch arrangement delivering the batches of dough into the first pan, together with a suitable ejector for removing the doughnuts from such pan and introducing them into the other pan where the frying operation is completed, together with means for removing the doughnuts from the second mentioned pan after being completed therein.

More especially it is a further object of the invention to provide means for simultaneously removing the doughnuts from the first pan and delivering them into the second pan in turned over condition. That is to say this device constitutes an ejector which serves to also turn over the doughnuts and deliver them in turned over condition into the second pan.

The two pan construction herein disclosed also presents the advantages of comparatively small size machine for a specified hourly capacity in dozens of doughnuts. This is because each pan may be made of relatively small diameter and may be turned more rapidly than is the case with previous constructions of machine wherein the pan must turn sufficiently slow to fry both sides of the doughnut.

The two pan construction herein disclosed also lends itself very well to a simple form of driving mechanism for rotating the pans, together with the necessary operative connections for the ejectors and the dough vat.

Another feature of the invention relates to the provision of an improved form of driving for the various parts including the valves whereby the batches of dough are delivered from the vat. More especially this feature of the invention concerns itself with improvements whereby the size of the batches of dough may be regulated so as to produce either larger or smaller doughnuts.

A further feature of the invention relates to the construction of the dough batch vat and valves. In this connection it is an object to produce a very simple construction and one which may be very easily operated with very simple movements automatically produced. In this connection it is a further object to so arrange these parts that they can be readily disconnected from time to time in order to remove the dough vat and valve mechanism for cleaning or refilling and similar operations.

Other objects and uses of the invention will appear from a detailed description of the same which consists in the features of construction and combinations of parts hereinafter described and claimed.

In the drawings:

Fig. 2 shows a cross section substantially on the line 2—2 of Fig. 1 looking in the direction of the arrows;

Fig. 3 shows a horizontal section or plan view looking down on the pans, said section being taken substantially on the lines 3—3 of Figs. 1 and 2, looking in the direction of the arrows;

Fig. 4 shows a top plan view of the operating mechanism on enlarged scale as compared to Figs. 1, 2 and 3;

Fig. 5 shows a fragmentary vertical section on the line 5—5 of Fig. 1, looking in the direction of the arrows and shows the delivery mechanism for ejecting from the second pan;

Fig. 6 shows a fragmentary section on the line 6—6 of Fig. 1 looking in the direction of the arrows but on enlarged scale and shows the operative connections for the valve members of the dough vat;

Fig. 7 shows a view at right angles to that of Fig. 6 and it shows in addition thereto more or less diagrammatically the positions of the two valves when the upper or ejector valve is at the top of its stroke, the lower or cut off valve being in the throat; and Fig. 8 shows a view similar to that of Fig. 7 with the exception that the parts have advanced substantially 120° of movement.

Figure 1:
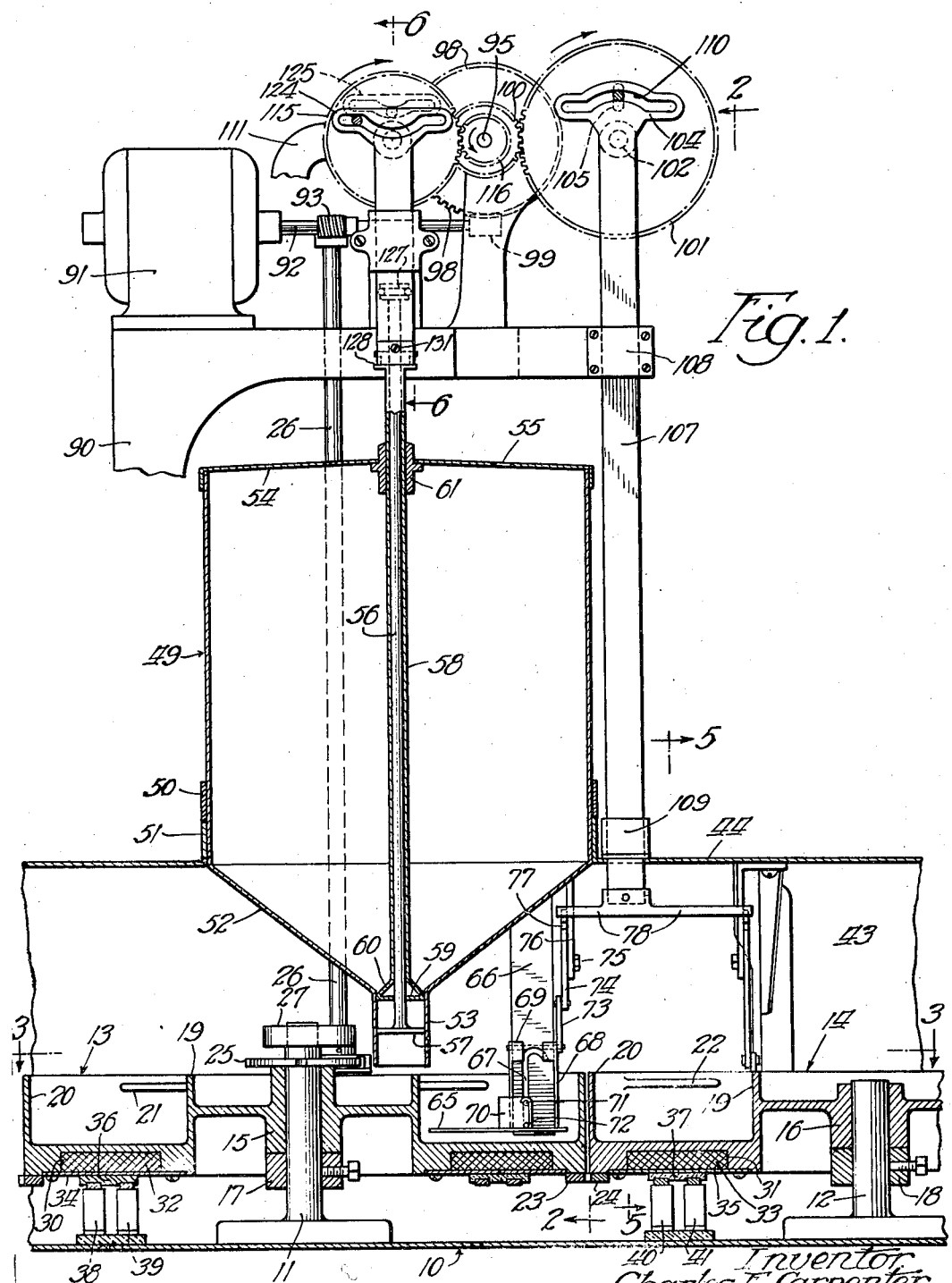
Figure 1 shows a vertical longitudinal section through a machine embodying the features of the present invention, the plane of the section being through the pivotal points of the two pans, and portions of the machine being cut away in order to reduce the size of the figure.

The machine includes any suitable form of base such as the plate 10. Mounted thereon are the studs 11 and 12 for the two pans 13 and 14. These pans I will refer to as the primary and secondary cookers. Each pan is circular in form and is preferably provided with a central hub. These are the hubs 15 and 16 respectively. They rest upon the collars 17 and 18 which are secured to the studs 11 and 12 by set screws as shown in Fig. 1.

Each pan is provided with a peripheral circular channel which is established by the inner and outer circular flanges 19 and 20. These channels are of sufficient depth to accommodate and retain the amount of grease necessary to carry on the frying operation therein.

Each pan is also provided with a series of radial arms or webs which divide the channel thereof into a series of compartments for the individual doughnuts. In the case of the pan 13 or primary cooker these are the arms 21 which reach radially outwards from the inner flange 19; whereas in the case of the secondary cooker 14 these are the arms 22 which reach radially inwards from the outer flange 20. Each cooker is provided with six arms establishing six compartments, each of a proper size to accommodate a single doughnut of ordinary dimensions.

The arms 21 and 22 are also located at such positions that they stand substantially at the level of the grease when in normal operation so that the doughnuts are retained in proper degree of separation from each other as they float on the grease.

The two pans are provided with companion ring gears 23 and 24 which mesh together (see particularly Figs. 1 and 3). These ring gears are of the same pitch and number of teeth so that the two pans are compelled to rotate in perfect synchronism. Furthermore the two pans are so meshed together that the pockets or receptacles come together in uniform timing as shown in Fig. 3. Furthermore the pans are compelled to rotate in opposite directions as shown by the arrowheads in such figure.

With the foregoing arrangement the rotation of a single pan suffices to drive them both. Such rotation should be of an intermittent character. For this purpose I provide on the hub 15 of the primary pan 13 a star wheel 25 having the same number of points as there are pockets in the pan (namely 6) and I provide in conjunction with said star wheel a vertical drive shaft 26 carrying at its lower end the disk 27 having the pin 28 which is located in the notch 29 of the disk so that as the shaft 26 is continuously rotated the six pointed star wheel is periodically advanced with an intermittent motion, carrying with it the pan 13, which in turn carries the pan 14 in the opposite direction.

The drive shaft 26 may be driven in any convenient manner as from an electric motor through the driving connections which I will presently explain.

The pans 13 and 14 may be heated in any desired manner. I have, however, shown said pans as being provided with circular recesses 30 and 31 in their bottom faces which receive the electric heating units 32 and 33, respectively. Said heating units are held in place and protected by the circular plates 34 and 35 so that they are completely enclosed. Said plates 34 and 35 carry circular insulating blocks 36 and 37 on which are mounted electrical slip rings as shown in Fig. 1. Contact brushes 38 and 39 work against the slip rings for the pan 13 and brushes 40 and 41 work against the slip rings for the pan 14.

A suitable housing is provided for protecting the parts. In the construction illustrated this housing includes the side walls 42 and 43 and the cover plate 44. The side walls are joined to the base plate 10 and to the cover plate 44 by angles 45, 46 and 47 and 48, respectively.

There is a dough hopper 49 supported by the cover plate 44 in proper position to deliver the dough portions down into the pan 13. This hopper 49 is provided with an encircling belt 50 which rests against the upturned flange 51 on the cover plate 44.

The lower portion of the hopper is drawn inwardly as shown at 52 and is provided with a downwardly depending neck 53 through which the dough batches are delivered into the pockets of the pan 13. This neck 53 stands in such position as shown in Fig. 3 that the dough batches are delivered into the central portions of the pockets when the pan 13 is at rest.

The hopper 49 has a removable cover plate 54. The same is preferably provided with a vent opening 55 so that the delivery of dough will not be restrained by the resistance of a vacuum in the hopper.

There is a valve rod 56 which reaches down centrally through the hopper and carries at its lower end a disk valve 57. This disk valve is the same size as the neck 53 and works easily within the same. There is a sleeve 58 around the stem 56, the lower end of said sleeve carrying a plunger 59 which also is of proper size to work in the neck 53. The top surface 60 of this plunger is preferably tapered or cone-shaped as clearly shown in Figs. 1, 7 and 8. The sleeve 58 acts as a guide and bearing for the stem 56. Furthermore, said sleeve 58 works freely through a collar 61 in the cover 54, said collar serving as a guide for the vertical movements of the parts.

The valve 57 and plunger 59 are reciprocated vertically and are in proper unison by mechanism which I will presently explain in detail.

There is an ejector 62 for delivering the articles from the pan 13 into the pan 14 and another ejector 63 for delivering the articles from the pan 14 into a chute 64 through which they are discharged from the machine after being completely fried. Incidentally also the ejector 62 serves to turn over the doughnuts as they are ejected from the pan 13 into the pan 14.

The ejector 62 includes a light sheet metal plate 65 which normally stands in horizontal position and in the lower portion of the circular grease pocket of the pan 13. This position is shown in Fig. 1. In such position this ejector stands below the positions of the radial partitions 21 and does not interfere with their travel.

There is a bracket 66 depending from the cover plate 44. This bracket is provided with a vertical slot 67 the upper end of which is curved over towards the right when viewed in Fig. 1. There is a sheet metal carriage 68 slidably mounted on the bracket 66. Said carriage has a pair of fingers 69 which reach partly around the bracket 66 so as to retain the carriage on the bracket while permitting the carriage to slide up and down.

The plate 65 is provided with an upturned finger 70 (see Figs. 1 and 3), which finger is provided with upper and lower pins 71 and 72. These pins reach side-wise into the slot 67; and the pin 72 also serves as a pivotal support for connecting the plate 65 to the bracket 68. The bracket 68 must be raised and lowered by a link 73 which is pivotally connected to one end of a lever 74, said lever being pivotally connected at 75 to a bracket 76 which depends from the cover plate 44. The other end of the lever 74 is provided with a finger 77 which may be engaged by one end of a pin 78 when said pin is forced downwardly. The movement of the pin 78 is automatically performed by mechanism which I will presently explain in detail.

Due to the shape of the slot 67 the plate 65 is given somewhat more than a quarter turn as it approaches the upper limit of its movement, said quarter turn being in a direction towards the pan 14. This will serve to turn the doughnut somewhat more than a half turn and at the same time deliver it sidewise towards the pan 14; so that the doughnut is delivered into the pan 14 in turned over condition.

The ejector 63 comprises a relatively light sheet metal plate 79 which normally stands in the lower portion of the circular grease receptacle of the pan 14. This position is shown in Fig. 5. There is a bracket 80 which hangs down from the cover plate 44, said bracket having a vertical slot 81 the upper end of which is turned over towards the left in Fig. 5. The plate 79 is provided with an upstanding lug 82 (see Fig. 3) which partially embraces the bracket 80; and a pin 83 reaches through to the lug 82 and through the slot 81 near the lower end of the bracket 80. Another pin 84 also reaches through the bracket 80 and through the slot 81 near the upper end of the bracket. Consequently, the plate 79 is normally sustained in the horizontal position of Fig. 5, but as it is raised it is tilted by reason of the fact that its inner edge travels upwardly more rapidly than its outer edge due to the shape of the slot 81. Consequently the doughnut supported by the plate will slide off of the outer edge thereof and down onto the chute 64. The lug 82 may be raised and lowered by means of a link 85 which is pivotally connected to the outer end of a lever 86, said lever being pivoted at the point 87 to a bracket 88 which hangs down from the cover plate 44. Said lever 86 is provided at its outer end with a finger 89 which is also engaged by the pin 78 when said pin is moved down.

I may state that the general arrangements of ejectors herein disclosed are also disclosed in Letters Patent of the United States No. 1,641,118 issued to me August 30, 1927.

There is a bracket 90 which reaches upwardly from a suitable supporting element such as the cover plate 44. The upper end of this bracket is turned out at right angles as shown at Figs. 1 and 2 and serves as a convenient support for various operating mechanisms.

An electric driving motor 91 is mounted on the bracket 90 and the shaft 92 of said motor is provided with a worm 93 which meshes with a worm gear 94 on the upper end of the main driving shaft 26. Thus the star wheel advancing mechanism is driven.

There is a jack shaft 95 journaled on the bracket 90 by the bearings 96 and 97. This jack shaft carries a worm gear 98 which is driven by a worm 99 on the motor shaft 92. The jack shaft 95 carries a pinion 100 meshing with a spur gear 101 on the stub staft 102 which is journaled in extension of the bracket 90. Said spur gear 101 carries a face disk 103 projecting from which there is a pin 104. Said pin can be adjusted to different radial positions on the disk 103 for which purpose said disk is slotted as shown in Fig. 1. A nut 106 may be provided to tighten up the pin in any adjusted position.

A pitman 107 is slidably mounted in an extension of the bracket 90 as shown at 108 and is also slidably mounted in the cover plate 44 as shown at 109. The upper end of this pitman is broadened out and is provided with a transverse slot 110 (see Fig. 1). The pin 104 works in said slot 110 so that as the disk 103 rotates the pitman rises and falls. The pin 78 is carried by the lower end of the pitman and moves accordingly. The slot 110 is preferably curved in its central portion so as to establish a dwell at the upper end of the stroke. For this purpose said curvature is concave downwardly and is formed on a radius approximating the average radius of adjustment of the pin 104. The result is that the pin 78 is normally sustained in the raised position with both of the ejectors in their lower positions; and the raising of the ejectors only takes place when the pitman is forced down.

There is another extension 111 reaching sidewise and forward from the bracket 90. A short shaft 112 (see Fig. 6) is journalled in this extension. Said shaft 112 carries the disks 113 and 114 on its ends; and the disk 113 is toothed as shown at 115 in Fig. 4.

A pinion 116 is carried by the jack shaft 95. Said pinion is preferably mounted on a squared end 117 of the jack shaft so that the pinion will be drivingly connected thereto so that the same may be slid endwise thereon.

Said pinion normally meshes with the gear 115 and thus drives both of the disks 113 and 114, but by sliding the pinion endwise it is unmeshed from the gear and the driving operation ceases.

There are two slides 118 and 119 which are slidably mounted in the bracket extension 111 adjacent to the disks 113 and 114. The disks are provided with pins 120 and 121 corresponding to these slides 118 and 119; and said pins may be set in at different radial positions on their disks by reason of their radial slots 122. Each pin is provided with a nut 123 by means of which it may be secured in adjusted position. The slides 118 and 119 are provided with cross heads 124 and 125 which have transverse slots 126 of the general shape shown in Figs. 7 and 8. These slots receive the pins 120 and 121 already referred to. Said slots are also provided with curved central portions to establish dwells; the curvature thereof facing upwardly. Thus the slides 118 and 119 are arrested at the lower ends of their movements. These curvatures approximate the average radius of the pins 120 and 121.

The upper ends of the pin 56 and sleeve 58 are provided with annular recesses 127 and 128 (see Fig. 6); the lower ends of the slides 118 and 119 are provided with bifurcated extensions 129 and 130 which may be secured to the slides by screws 131. By removing these screws the extensions may be disengaged from the slides and also from the slots so that the driving connections are disengaged.

The pins 120 and 121 of the two disks are set substantially in quartering positions with respect to each other. That is to say when viewing the device as in Figs. 1, 7 and 8 the disks rotate in the directions of the arrows and the pin 121 for the valve 57 leads the pin 120 for the plunger 59 by approximately 90°. As a result the valve 57 starts moving down while the plunger 59 stands above the throat 53 (see Fig. 7), thus drawing a fresh charge of dough down into the throat. Shortly thereafter the plunger 59 moves down into the upper end of the throat and thus closes the same. Thereafter both the valve and plunger move down together with the doughbatch trapped in the throat, and presently the valve passes out of the lower end of the throat so as to open the same (see Fig. 6). The valve then stops its downward travel and starts upwards, and about this time the plunger comes to rest at the bottom of its stroke. The dough having been ejected through the lower open end of the throat, as the valve rises, said dough is perforated and cut off and drops down into the pan 13.

The valve and plunger then move upwards together and presently the valve comes to rest at the upper end of its stroke, the plunger moving on upwards and above the throat into the position of Fig. 7. Due to the creation of a partial vacuum in the throat during the last portion of the upward movement of the plunger, the fresh dough batch will be drawn in under the plunger and into the throat ready for a new cycle of operations.

By tapering the upper end of the plunger as shown at 60 said plunger is enabled to move easily upward into the mass of dough without serious disturbance thereto.

This will allow the plunger to move up and down in the dough mass with minimum amount of disturbance to the dough. This is an important point for the reason that the disturbance of the dough tends to knead the same with the result that the mass of dough tends to stiffen up and will not feed as satisfactorily as otherwise.

From the foregoing it will be seen that all of the parts are driven in a simple and direct manner from a single driving motor; and also that it is possible to disengage the driving of the doughbatch feeder by simply slipping the gear 116 sidewise and without stopping the rest of the machine. This makes it possible to continue the operation of rotating the pans and ejecting the doughnuts after the dough batch mechanism has been stopped so that the machine may be fully cleared at the end of a run.

While I have herein shown and described only a single embodiment of the features of my present invention still I do not intend to limit myself thereto except as I may do so in the claims.

I claim:

1. In a machine of the class described the combination of a pair of horizontal frying pans, located in close proximity to each other, central pivotal mountings for the same, a series of radial arms in each pan establishing individual doughnut compartments therein, there being the same number of compartments in both pans, gears on the two pans in direct connection with each other serving to cause both pans to rotate in synchronism and in opposite directions with the compartments of both pans coming into proximity and regular sequence, means for rotating one pan intermittently to thereby also rotate the other pan intermittently and in synchronism, means for heating both pans, means for delivering doughbatches into the compartments of one pan at a position beyond the position of proximity aforesaid, to cause said doughbatches thereby to be carried around with said pan in its travel, an ejector in said pan located in position to remove the cooking articles therefrom at the position of proximity aforesaid and to deliver said article into the compartments of the other pan in turned over condition, and an ejector for removing the articles from the last mentioned pan after completion of substantially a complete revolution thereof, substantially as described.

2. In a machine of the class described the combination of primary and secondary frying pans located in close proximity to each other, driving connections between the two pans serving to cause them to rotate at equal speeds in opposite directions, a series of radial arms in each pan establishing individual doughnut compartments therein, there being the same number of compartments in both pans, means for delivering dough batches into the compartments of the primary pan, means for heating both pans, means for rotating the pans, an ejector in position to remove articles from the primary pan and deliver them into the secondary pan at a position where the pans are in close proximity to each other and an ejector for removing the articles from the secondary pan after they have completed substantially a complete revolution with said pan, substantially as described.

3. In a machine of the class described the combination of a pair of non-concentric independent frying pans located in close proximity to each other, means for driving both of said pans in timed relationship, means for establishing a series of individual compartments in each pan, there being the same number of compartments in both pans, means for introducing dough batches into the compartments of one pan, means for ejecting the articles from the compartments of said pan after said pan has completed substantially a complete revolution and for delivering said articles into the compartments of the other pan and means for ejecting the articles from the last mentioned pan after they have completed substantially a complete revolution with said pan, substantially as described.

4. In a machine of the class described the combination of a pair of independent frying pans located in close proximity to each other and in the same plane, means for simultaneously driving both of said pans intermittently but at equal speeds, means for periodically delivering dough batches into one pan, means for ejecting the articles from said pan after they have completed substantially a complete revolution and for delivering said articles into the other pan and means for ejecting the articles from the last mentioned pan after they have completed substantially a complete revolution in said pan substantially as described.

5. In a machine of the class described the combination of a pair of non-concentric frying pans located in the same plane with their edges in close proximity to each other, means for simultaneously driving both pans in opposite directions, means for introducing individual doughbatches into one pan, means for ejecting the articles from said pan and for delivering them into the other pan close to the position where the pans are close together and means for ejecting the articles from the last mentioned pan after they have completed substantially a complete revolution, substantially as described.

6. In a machine of the class described the combination of a pair of nonconcentric frying pans located in the same plane and with their edges in close proximity to each other, means for simultaneously driving both pairs, means for introducing individual doughbatches into one pan, means for ejecting the articles from said pan and delivering them into the other pan at a point where the pans are close together and means for ejecting the articles from the last mentioned pan, substantially as described.

7. In a machine of the class described the combination of a pair of independent non-concentric circular pans located in the same plane and with their edges in close proximity to each other, a driving connection between the edge portions of said pans causing them to rotate in synchronism, means for driving one pan, means above one pan for delivering individual doughbatches thereinto, means for ejecting the articles from said pan and delivering them into the other pan, means for ejecting the articles from the last mentioned pan and means for driving all of said parts in timed relationship, said driving means being located above the pans, substantially as described.

CHARLES E. CARPENTER.